United States Patent [19]
Ghezzo et al.

[11] Patent Number: 5,367,585
[45] Date of Patent: Nov. 22, 1994

[54] INTEGRATED MICROELECTROMECHANICAL POLYMERIC PHOTONIC SWITCH

[75] Inventors: Mario Ghezzo, Ballston Lake, N.Y.; Christopher P. Yakymyshyn, Raleigh, N.C.; Richard J. Saia, Schenectady, N.Y.; Dennis L. Polla, Raleigh, N.C.

[73] Assignee: General Electric Company, Schenectady, N.Y.

[21] Appl. No.: 144,165

[22] Filed: Oct. 27, 1993

[51] Int. Cl.⁵ .............................. G02B 6/10
[52] U.S. Cl. ................... 385/23; 385/131; 385/132; 385/40
[58] Field of Search ............ 385/23, 129, 130, 131, 385/132, 40, 16.2, 17, 18

[56] References Cited

U.S. PATENT DOCUMENTS

| | | | |
|---|---|---|---|
| 4,681,397 | 7/1987 | Bhatt | 350/96.20 |
| 5,044,745 | 9/1991 | Inoue et al. | 385/16 |
| 5,155,620 | 10/1992 | Gordon et al. | 385/2 |

OTHER PUBLICATIONS

"Waveguide Electrooptic Switch Arrays" by Rod C. Alferness, IEEE Journal on Selected Areas In Communications, vol. 6, No. 7, Aug. 1988, pp. 1117–1130.

"A Silicon–Based Moving–Mirror Optical Switch", by Mino F. Dautartas, et al, IEEE Journal of Lightwave Technology, vol. 10, No. 8, Aug. 1992, pp. 1078–1085.

"A Plastic Optical Fiber Based Photonic Switch", by G. J. Grimes, et al, SPIE vol. 1592 Plastic Optical Fibers (1991), pp 139–149 (No Month).

"Fiber Optic Sheet Formation by Selective Photopolymerization", by Takashi Kurokawa, et al, Applied Optics, vol. 17, No. 4, Feb. 1978, pp. 646–650.

"Demonstration of an Integrated, Active 4×4 Photonic Crossbar", IEEE Photonics Technology Letters, vol. 4, No. 10, Oct. 1992, pp. 1139–1141.

"Deformable Grating Optical Modulator", by O. Solgaard, et al, Optics Letters, vol. 17, No. 9, May 1, 1992, pp. 688–690.

"Electromechanical Optical Switching and Modulation in Micromachined Silicon–On–Insulator Waveguides", by R. Watts, et al, 1991 IEEE, pp. 62–63 (No Month).

Oct. 1993–"Integrated VHF Data Link For Air Traffic Control Applications'," Handouts For a Presentation Of The Air Traffic Control Assoc. (ATCA) Conference, Nashville, Tenn.

*Primary Examiner*—John D. Lee
*Assistant Examiner*—Phan Thi Heartney
*Attorney, Agent, or Firm*—Ann M. Kratz; Marvin Snyder

[57] ABSTRACT

A microelectromechanical photonic switch includes first and second waveguides. Insulative cladding containing a gap and having a lower refractive index than the refractive indices of the first and second waveguides is situated between the first and second waveguides. One electrode comprising an at least partially transparent material is situated on the same side of the gap as the second waveguide. An additional electrode is provided either on the same side of the gap as the first waveguide or over a piezoelectric strip above a cladding layer on the second waveguide. At least one of the electrodes is capable of being advanced towards the other of the electrodes so as to cause one of the first and second waveguides to advance towards the other of the first and second waveguides.

19 Claims, 10 Drawing Sheets

INTEGRATED MICROELECTROMECHANICAL POLYMERIC PHOTONIC SWITCH

CROSS-REFERENCE TO RELATED APPLICATION

This application is related to the following co-pending application which is commonly assigned: Ghezzo et al, "Microelectromechanical Photonic Switching Arrays", Ser. No. 08/144,119, filed Oct. 27, 1993.

BACKGROUND OF THE INVENTION

1. Field of the Invention

This invention relates generally to photonic switches, and, more particularly, to a switch based on microelectromechanical motion of overlapping polymer waveguides.

2. Description of the Related Art

One conventional photonic switch uses the Mach-Zehnder device architecture with non-linear optical crystals. Although eight-by-eight arrays have been fabricated, this type of switch is expensive to manufacture and difficult to fit on standard electro-optic packages. Commercially available non-linear optical crystal switches that fit on a single substrate are limited to two-by-two arrays. A larger array is yield-limited by its size, which is determined by the electro-optic coefficient of the non-linear crystal, usually $LiNbO_3$, and by the applied voltage, which must comply with the material dielectric strength.

Mother method of photonic switching is to convert the optical signal to an electrical signal, reconfigure the input-to-output channel assignment electronically, and convert the electrical signal back to an optical signal. This complicated procedure adds significant overhead to the signal propagation introduced by the decoder and modulator circuitry, thus increasing the time delay and the power consumption. This method is also limited by the bandwidth restrictions of the opto-electronic convertor which downgrade the optical network capabilities.

Electromechanical deflection of reflective surfaces has been used for waveguide photonic switching by means of microcantilevers or microbridges, as described in R. Watts et al., "Electromechanical Optical Switching and Modulation in Micromachined Silicon-on-Insulator Waveguides," 1991 IEEE International SOI (silicon-on-insulator) Conference Proceedings, pp. 62–63. A voltage supplies electrostatic attraction resulting in a deflection of the microcantilever or microbridge. When this technique is used in free space, alignment and vibration problems can occur.

Micromachining has recently been used for fabrication of diffraction gratings for spectral analysis and optical modulator switches because of the high resolution sculpting capability of this technique, as described in O. Solgaard et al., "Deformable grating optical modulator," Optics Lettors, vol. 17, no. 9, 688–90 (May 1, 1992). Other approaches include a monolithic four-by-four photonic crossbar switch that has been fabricated for avionic systems using rib waveguides with etched facets and turning mirrors, and a multimode two-by-two optical switch in which micromachined pivoting silicon moving mirrors selectively direct optical beams from input to output fibers. Vibration and alignment difficulties reduce the effectiveness of these techniques.

Polymeric waveguide technology has been used with ferroelectric liquid crystals to develop a six-by-six matrix switching array and provide guided wave connectivity to a multi-element spatial light modulator. The maximum operating temperature of this type of switch is about 60° C., however, which is too low for aerospace, military, and automotive applications. Furthermore, this device requires a three-dimensional construction which is not amenable to batch fabrication.

SUMMARY OF THE INVENTION

Accordingly, one object of the invention is to provide a simple low-cost photonic switch having a high tolerance to a wide range of ambient operating conditions for use in a monolithic photonic cross-point array.

The switch of the present invention uses microelectromechanical motion of overlapping polymer waveguides. The principle of operation is based on modulation of optical energy transfer between overlapping waveguides which determines whether the incoming light totally remains in the initial waveguide or is partially transferred to the adjacent waveguide. This transfer depends on the mutual separation between waveguides, which is controlled by electrostatic or piezoelectric actuation.

Briefly, in accordance with a preferred embodiment of the invention, a microelectromechanical photonic switch comprises a first waveguide and a second waveguide. Insulative cladding having a gap is situated between the first and second waveguides and has a lower refractive index than the refractive indices of the first and second waveguides. The first waveguide is positioned such that a predetermined first waveguide portion is on one side of the gap, and the second waveguide is positioned such that a predetermined second waveguide portion is substantially parallel to the predetermined first waveguide portion and situated on an opposing side of the gap. Means are provided for moving at least one of the predetermined first and second waveguide portions closer to the other of the predetermined first and second waveguide portions in response to an actuation force.

The moving means may include a first electrode and a second electrode. The first electrode is situated either between a portion of the first waveguide and a portion of the gap or above a piezoelectric strip on a cladding over the second waveguide. If situated between the first waveguide and the gap, the first electrode comprises an at least partially transparent material. The second electrode comprises an at least partially transparent material which is situated between a portion of the second waveguide and a portion of the gap. Means are provided for advancing at least one of the first and second electrodes towards the other of the first and second electrodes and thereby advancing at least one of the first and second waveguides towards the other of the first and second waveguides.

Whereas light transfer is prevented by an air gap, light transfer is enabled by close proximity between waveguides over an adequately long path. The presence of an air gap establishes light isolation between waveguides because light travels in the medium of higher refractive index, which in this embodiment is optically transparent polyimide comprising the waveguides. Since the refractive index of air is much lower (about 1) than the refractive index of the polyimide (about 1.5–1.55), light is totally reflected at the polyimide/air boundary. To remove the air gap, at least one movable waveguide is mechanically bent until that waveguide becomes close enough to the other waveguide over an adequately long path so that light can partially pass from one waveguide to the other. The bending is implemented with minor angular deflection to reduce optical bending losses. Bistable switching positions can easily be maintained, thus avoiding the bouncing associated with spring loaded switches.

The mechanical properties of polyimide are important for the switch operation because a small elasticity modulus is necessary for waveguide deflection in response to a small actuation force. The invention avoids noises caused by vibration because the switch does not have a free-space optical path. Additionally this system is insensitive to light spectrum and polarization and tolerates a wide range of ambient temperatures.

BRIEF DESCRIPTION OF THE DRAWINGS

The features of the invention believed to be novel are set forth with particularity in the appended claims. The invention itself, however, both as to organization and method of operation., together with further objects and advantages thereof, may best be understood by reference to the following description taken in conjunction with the accompanying drawings, where like numerals represent like components, in which:

FIGS. 2a–2k are views illustrating steps in a process for fabricating the switch of FIG. 1a;

DETAILED DESCRIPTION OF PREFERRED EMBODIMENTS OF THE INVENTION

Figure 1A:
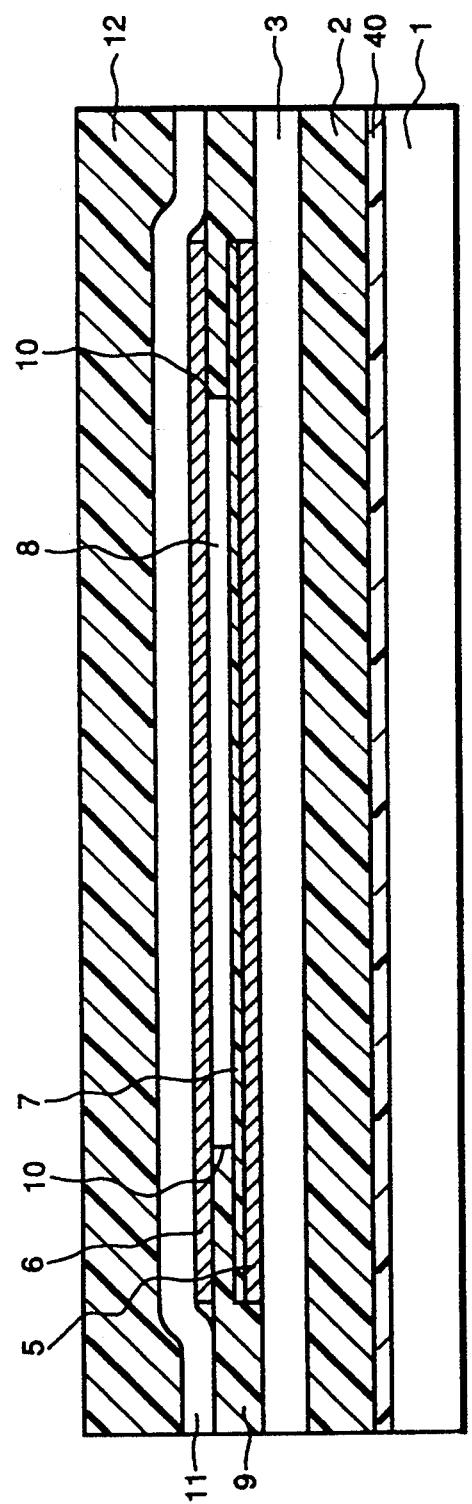
FIG. 1a is a cross-sectional view of one embodiment of a switch of the present invention in an unactuated state.
Figure 1B:
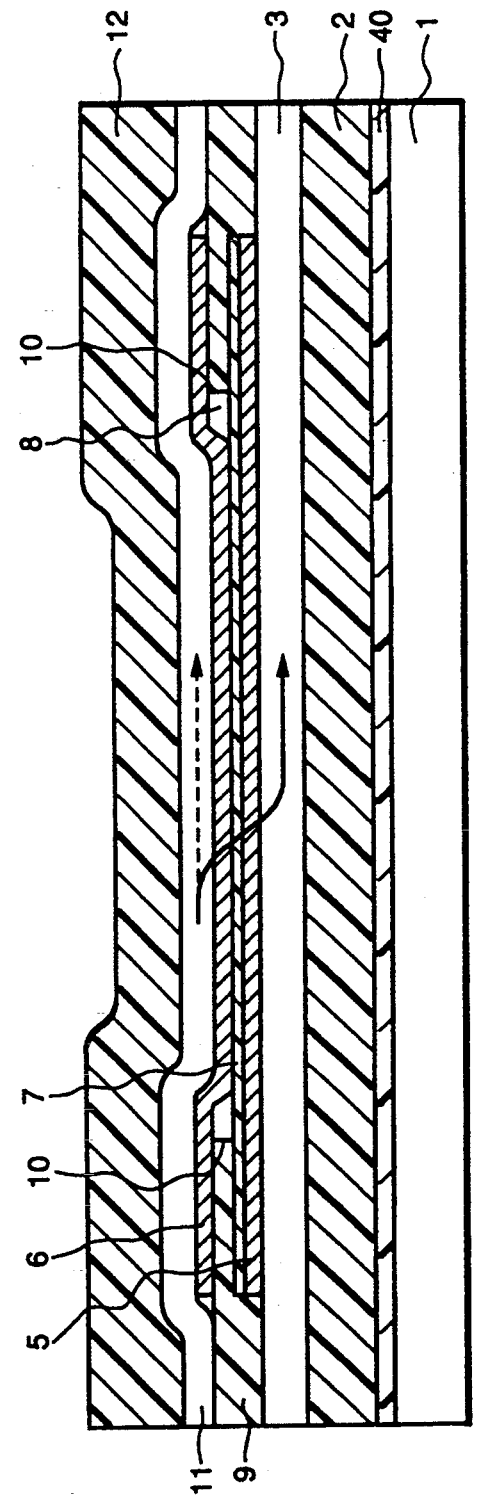
FIG. 1b is a view of the switch of FIG. 1a in an actuated state.

FIGS. 1a and 1b are cross-sectional views of an embodiment of an electrostatically actuated switch of the present invention in unactuated and actuated states, respectively. The principal elements of the switch are a first optical waveguide 3 and a second waveguide 11 which are separated by an air gap 8. A first electrode 5 covered with an insulator layer 7 and a second electrode 6 are used to couple light from one waveguide to another. Electrodes 5 and 6 and insulator layer 7 are all at least partially transparent to optical energy.

When the voltage between the first and second electrodes is zero, the first and second waveguides are separated by air gap 8 and by an insulative cladding 9, leaving them optically and mechanically isolated. In this position the structure is in equilibrium, and thus can remain in equilibrium indefinitely without a holding force. When voltage is applied across the first and second electrodes, second waveguide 11 is pulled downwards electrostatically by the mutual attraction of electrodes 5 and 6 towards first waveguide 3, as shown in FIG. 1b, making mechanical contact through the second electrode and insulator layer 7 covering the first electrode over most of the air gap length. Hence the evanescent wave of the light-carrying waveguide penetrates into the adjacent waveguide, creating a partial optical energy transfer. There is no need to achieve 100% transfer since the switch only requires ON/OFF behavior for one output port. Other optical losses are caused by geometrical waveguide distortions, interposed transparent electrodes, discontinuities, and surface scattering.

Although the switch is shown in this embodiment as being formed and positioned in a vertical orientation, it matters neither how the switch is manufactured nor whether the orientation of the switch in a device is vertical or horizontal. Because the mass of the switch is small, gravity does not have much effect on electrode motion, and one or both electrodes (and thus both waveguides) tend to draw together in response to an electrostatic force no matter what the orientation of the switch.

FIGS. 2a–2k are views illustrating steps in a process for fabricating the switch of FIG. 1a. The sectional views shown are perpendicular to the views shown in FIGS. 1a–1b and 3a–3b.

Figure 2A:
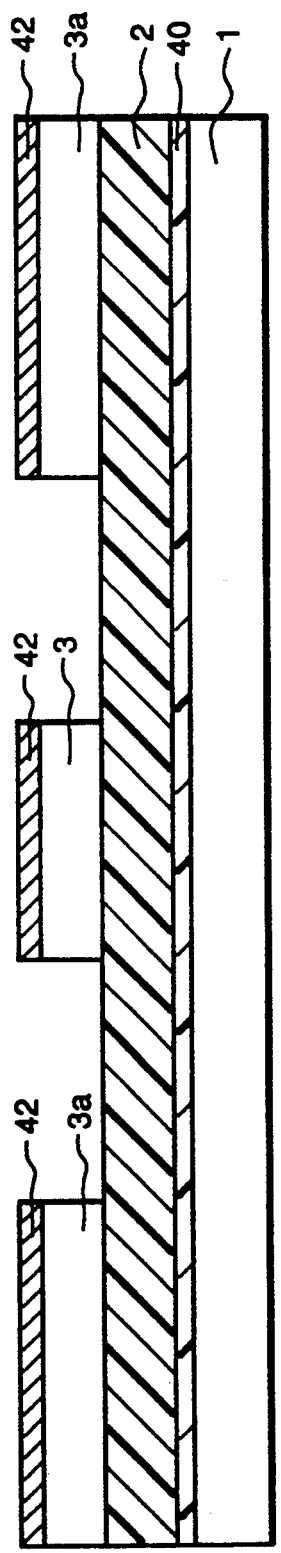

As shown in FIG. 2a, a substrate 1, which is preferably a portion of a silicon wafer about 500 μm thick, provides mechanical support and allows integration of the switch. Substrate 1 can include similar switches in an array geometry, for example, and can further include electronic controls fabricated in the silicon prior to the photonic switch fabrication. In one embodiment, the substrate is passivated by thermally growing or depositing a 5000 Å thick silicon dioxide layer 40. A first cladding layer 2, about 10 μm-thick, is applied, by spin-coating, for example, over the silicon dioxide layer. A first waveguide 3 is applied and patterned over first cladding layer 2 and has a higher refractive index than the refractive index of the first cladding layer. First waveguide 3 is about 10 μm-thick and is optimized for multi-mode light transmission. Patterning can be accomplished by any appropriate technique, such as, for example, using excimer laser ablation or reactive ion etching to remove the layer in regions not protected by a lithographically-defined temporary metal mask 42, comprising aluminum, for example. Spacers 3a, which can be applied and patterned at the same time with the same material as the first waveguide, provide a means of maintaining a planar structure.

Both first cladding layer 2 and first waveguide 3 preferably include polyimide materials which are chosen according to their refractive indices and optical transmissivities per unit length. Waveguides need a higher refractive index than cladding to generate total internal reflections at the waveguide boundaries and thus eliminate external light loss. The refractive index change is easily accomplished by a slight modification of the polyimide composition. For example increasing the fluorine content in a polyimide results in a lower index of refraction.

Figure 2B:
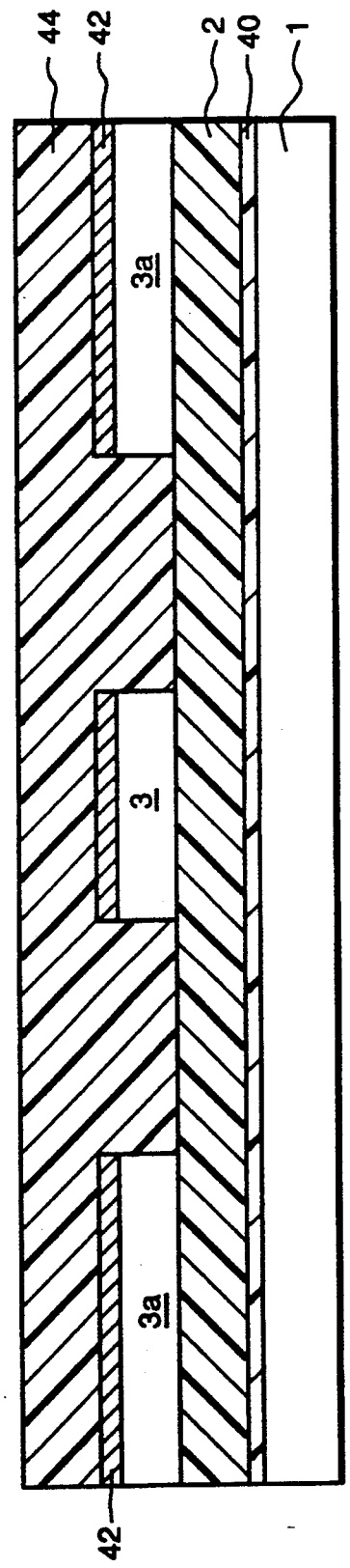

As shown in FIG. 2b, to achieve a planar surface, cladding material 44, preferably comprising a material similar to that of first cladding layer 2, is applied, by spin coating for example, over the first cladding layer, the waveguide, and the spacers. Cladding material 44 can then be etched using an oxygen plasma to the level of metal mask 42. The metal mask can be removed with a wet etch without damaging the first waveguide, resulting in the embodiment shown in FIG. 2c.

Figure 2C:
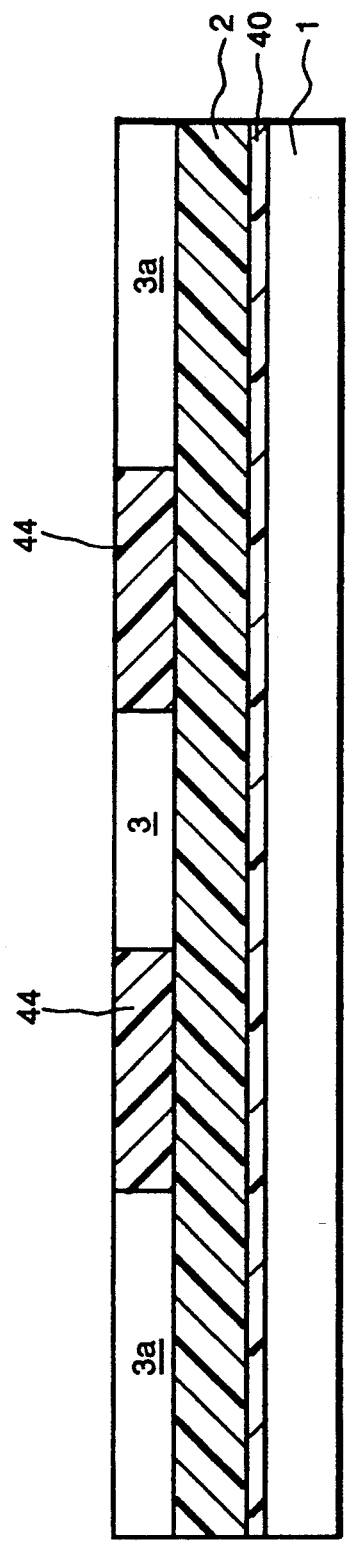

In a preferred embodiment for providing a planar surface, the waveguide is formed from a material having a refractive index which can be changed by exposure to light or other energetic beams. Thus, portions of the material which will become the waveguide can be exposed to light, leaving non-exposed portions intact and resulting in a planar surface such as shown in FIG. 2c.

Figure 2D:
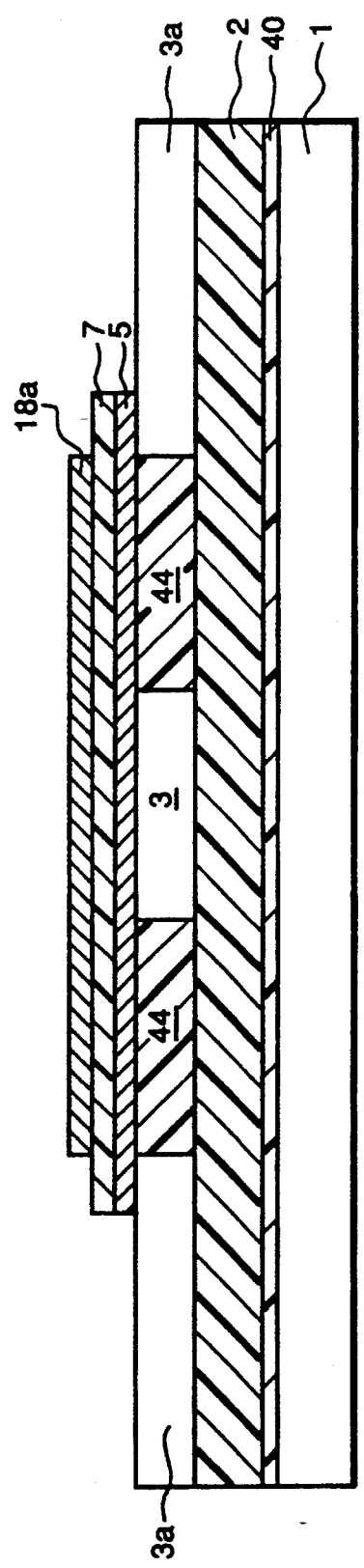

As shown in FIG. 2d, first electrode 5 can be formed over portions of first waveguide 3, spacers 3a, cladding material 44, and first cladding layer 2. The first electrode is about 400 Å thick and preferably comprises an at least partially transparent material such as antimony tin oxide (ATO) or indium tin oxide (ITO). First electrode 5 can be deposited by radio frequency sputtering, for example. A thin insulator layer 7 is applied over first electrode 5 for electrical isolation during mechanical contact between first electrode 5 and second electrode 6 (second electrode 6 shown in FIGS. 1a–1b). Insulator layer 7 is preferably at least partially transparent and can be organic, such as a polymer layer, or inorganic, such as an oxide layer. In one embodiment, the thin insulator layer comprises a silicon dioxide film having a thickness of approximately 400–1000 Å. When the thin insulator layer is an oxide layer, the insulator is also useful as an etch stop during formation of an air gap 8 (air gap 8 shown in FIG. 1a). In one embodiment, it is useful to deposit a 2000 Å copper layer 18a to be used as a seed layer. The copper can be patterned using a photoresist and ferric trichloride etch.

Figure 2E:
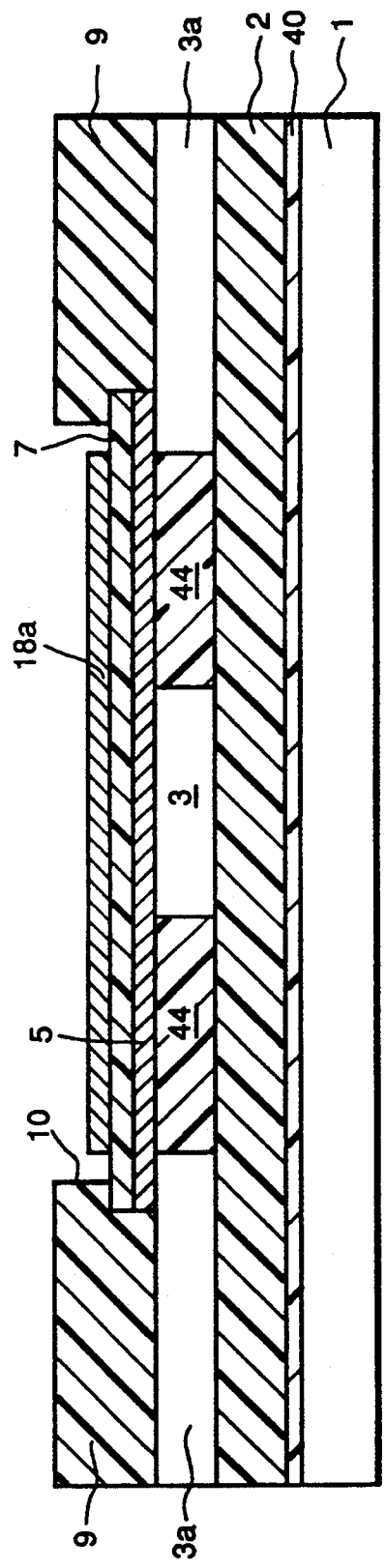

An insulative cladding layer 9 is next applied, as shown in FIG. 2e. In one embodiment this application is made by spin coating the insulative cladding layer from a liquid source for planarization. In this embodiment, the cladding material may comprise polyimide having similar properties as the first cladding layer material and a thickness of 15 μm, for example.

Figure 2F:
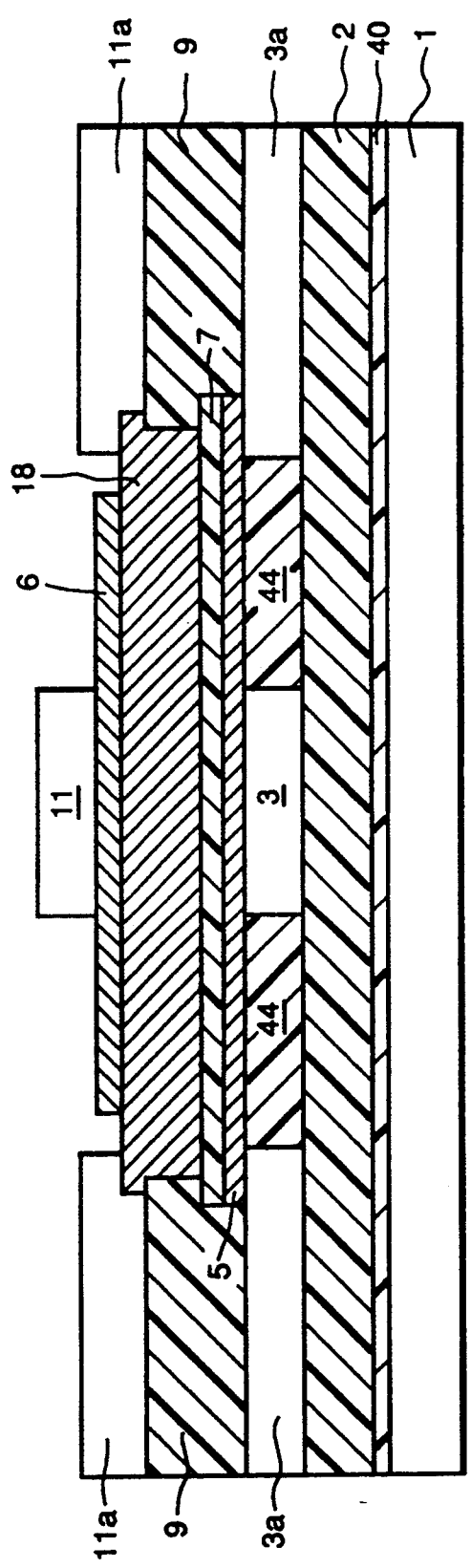

A well 10, which provides an air gap 8 (air gap shown in FIG. 1a), is formed in insulative cladding layer 9 preferably by using excimer laser ablation with a temporary aluminum mask (not shown). As shown in FIG. 2f, the well is then refilled with a self-aligned layer of electroplated copper using the sputtered copper 18a (shown in FIGS. 2d–2e) as a seed material to form sacrificial layer 18, for example. Ghezzo et al., "Micromechanical Moving Structures Including Multiple Contact Switching System, and Micromachining Methods Therefor," U.S. application Ser. No. 08/000,172 (attorney's docket number RD-21,336), filed Jan. 4, 1993, discloses a method of applying a sacrificial layer of copper and is herein incorporated by reference. Sacrificial layer 18 can comprise any material which is removable by a process that does not damage the switch.

Second electrode 6 is formed over insulative cladding layer 9 and sacrificial layer 18 by film deposition and patterning. In one embodiment, the second electrode comprises an ITO or ATO film having a thickness of 400 Å. The first and second electrodes, as well as insulator layer 7, must be at least partially transparent because they are, in this embodiment, positioned between the waveguides to reduce their maximum separation and consequently increase the electrostatic force. Transparency is required to allow light transfer between the waveguides when the electrodes are in mechanical contact.

A second waveguide 11, with respective spacers 11a, is formed over second electrode 6 and insulative cladding 9 by spincoating and patterning a 10 μm thick polyimide material with a similar index of refraction as first waveguide 3. The second waveguide is positioned so that a portion of the second waveguide is on one side of sacrificial layer 18 and a portion of the first waveguide is situated on an opposite side of sacrificial layer 18. The first and second waveguide portions on opposite sides of sacrificial layer 18 are substantially parallel in that, after the sacrificial layer is removed, at least one of the waveguides is movable in the direction of the other of the waveguides and capable of transferring light, as shown in FIG. 1b.

Figure 2G:
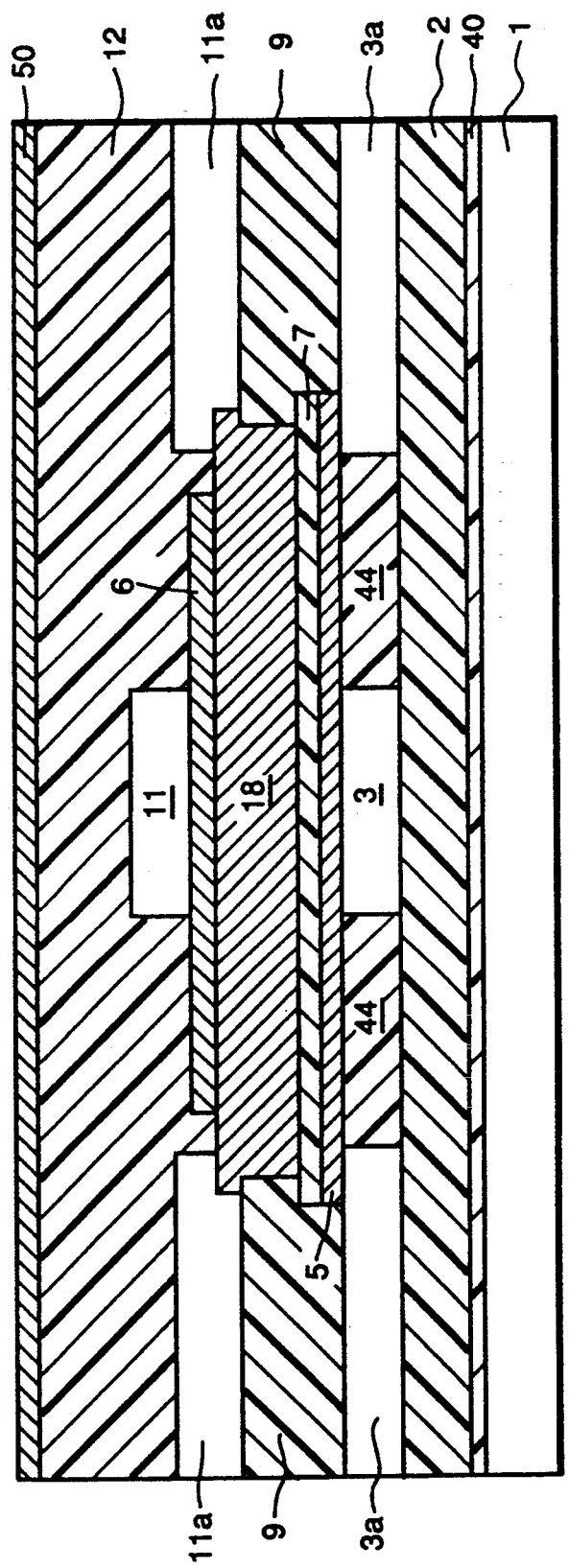

Neither second electrode 6 nor second waveguide 11 completely covers the sacrificial layer. As shown in FIG. 2g, a second cladding layer 12, formed by spin coating or lamination, completes the switch structure by sealing second waveguide 11 with a polyimide of a lower refractive index. Second cladding layer 12 may comprise a polyimide having a thickness of 10 μm, for example. Each of the materials used in the photonic switch must be stable at the operating temperatures of the device at which the switch will be used. Typically the ambient temperatures range from −55° C. to 125° C. A mask 50, comprising a 2000 Å thick aluminum film, for example, is then applied to second cladding layer 12.

Figure 2H:
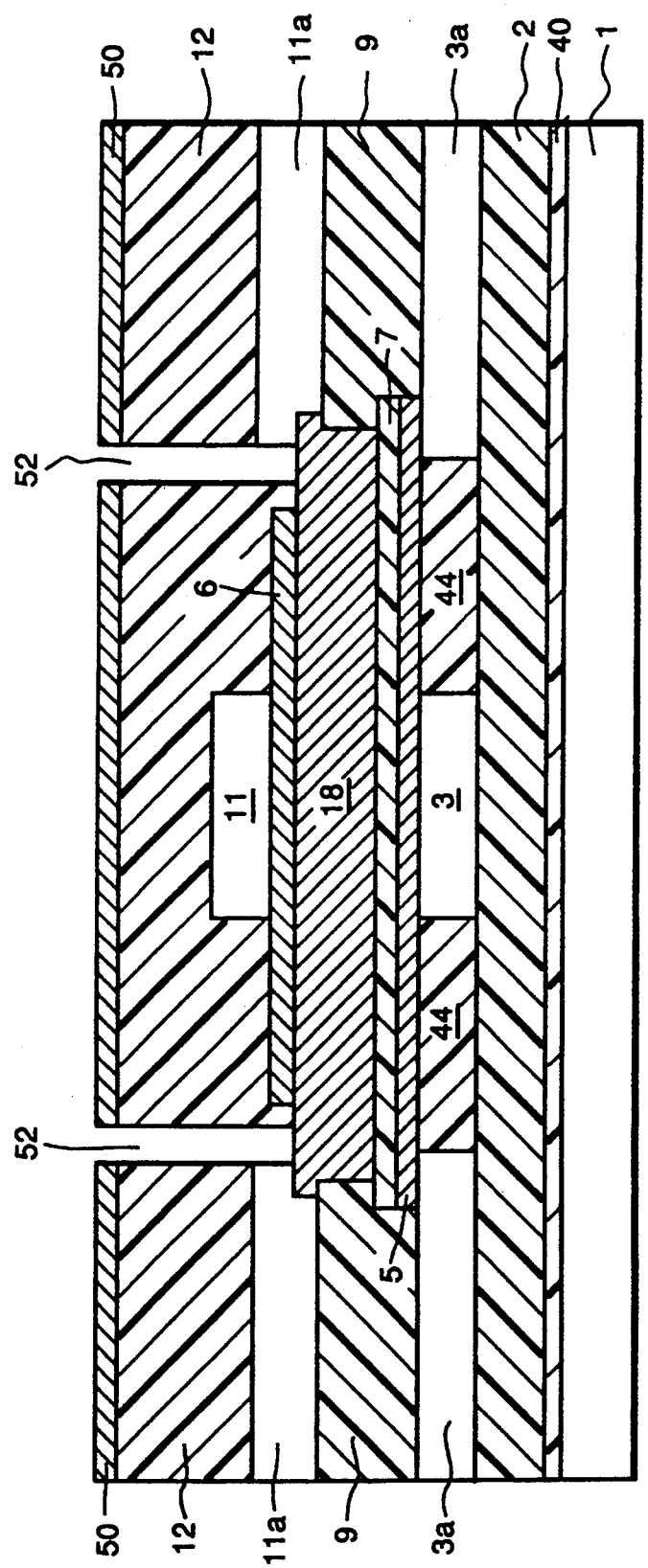
Figure 2I:
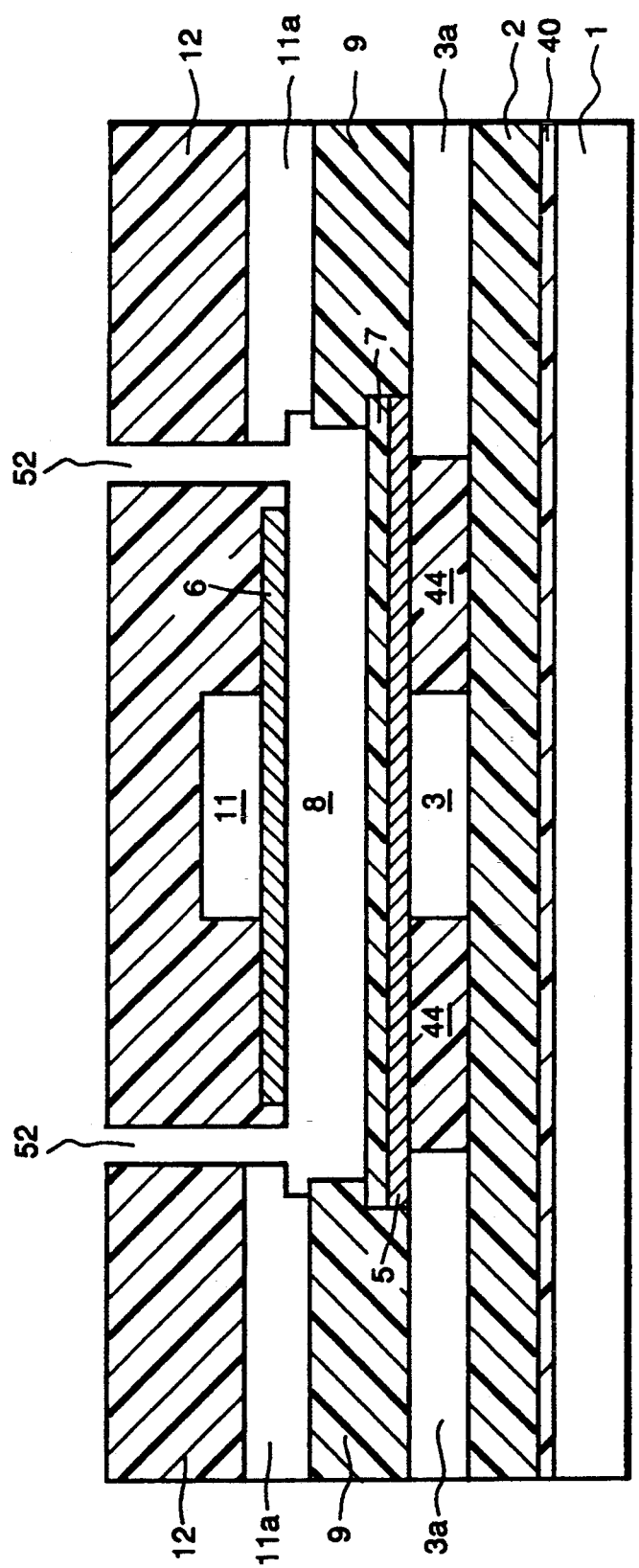
Figure 2J:
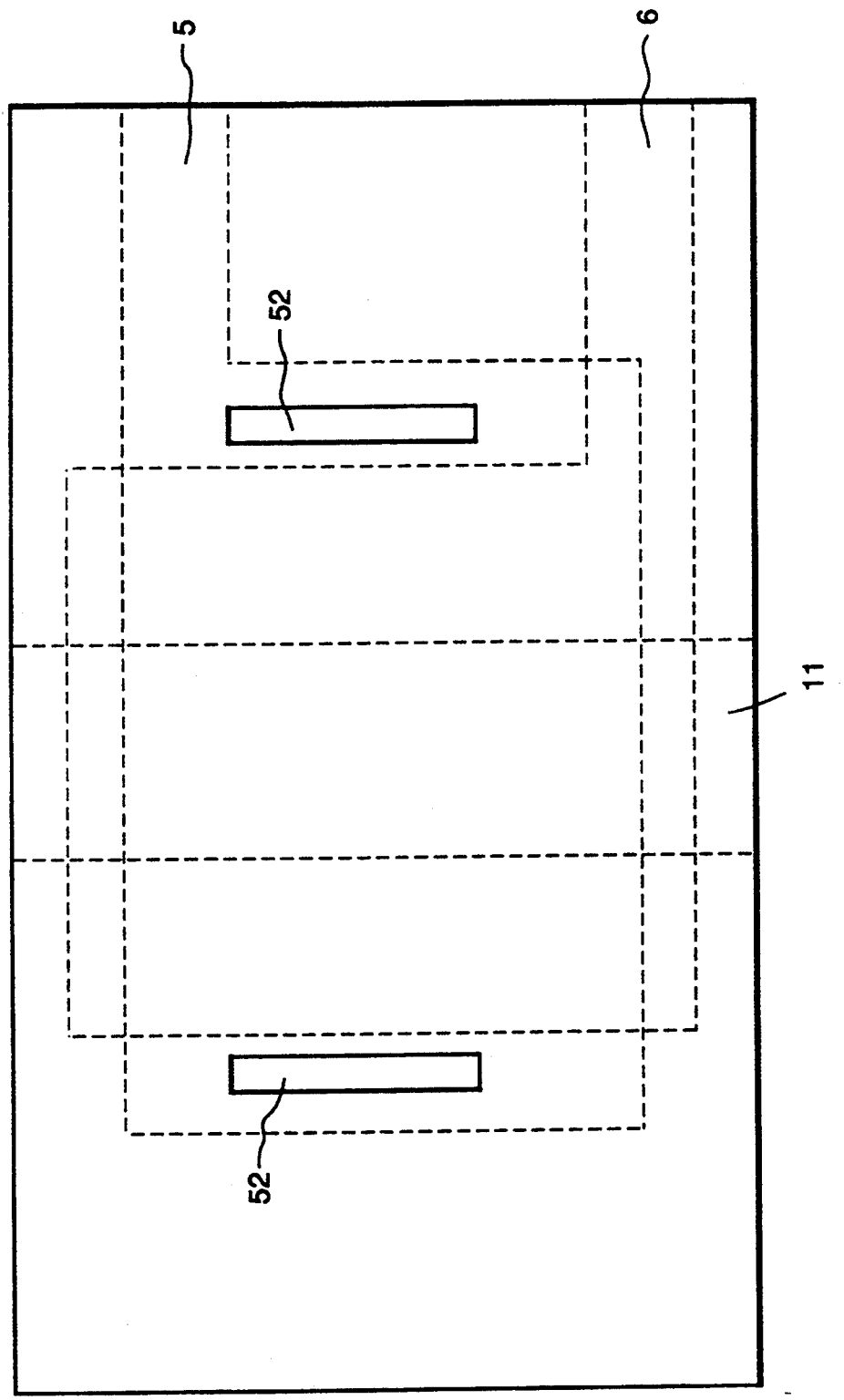

As shown in FIG. 2h, the mask can be patterned using a photoresist and then used for laser-ablating or reactive ion etching slots 52 in the cladding material. After mask 50 and the second cladding layer are patterned, the mask is removed and sacrificial layer 18 is laterally etched from air gap region 8 (air gap shown in FIGS. 1a–1b) by applying a selective etch which etches the sacrificial layer but not the electrodes or waveguides, as indicated in FIG. 2i. If copper is the material of the sacrificial layer, the lateral etch rate using a solution of ferric trichloride (FeCl₃) is larger than 10 mil/hr, thus allowing a tunnel to be opened under a 20 mil-wide waveguide in less than one hour. FIG. 2j is a top plan view of waveguide 11, electrodes 5 and 6, and slots 52 of FIG. 2i. The use of a sacrificial layer, although preferred, is not required for this invention. Any method of applying the second electrode over a selected portion of insulative cladding 9 and well 10 which retains the spatial integrity of an opening in the well is appropriate.

Well 10 (shown in FIG. 1a) is preferably not any thicker than required to isolate light in an unactuated state and provide adequate light transfer in an actuated state because waveguide motion is preferably limited to several micrometers in order to use electrostatic actuation voltages compatible with conventional integrated circuit technology. Additionally, limiting the deflection distance of the second waveguide leads to short mechanical switching time (preferably less than 100 μsec).

Figure 2K:
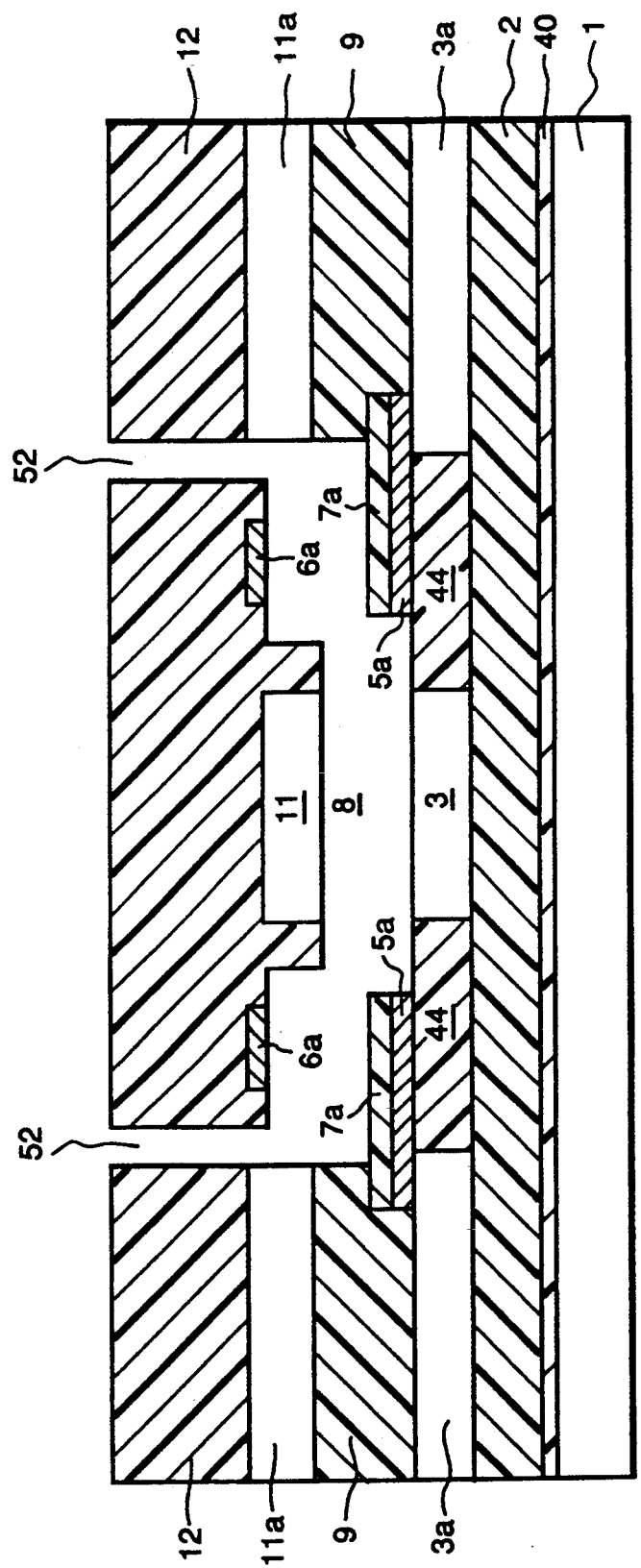

Many modifications can be made to the embodiments discussed thus far, one of which is represented by the embodiment of FIG. 2k. In this embodiment, instead of the first and second electrodes 5 and 6 being applied over or otherwise touching the first and second waveguides 3 and 11, the electrodes 5a and 6a are laterally situated on opposite sides of respective waveguides and do not come between a respective waveguide and air gap 8. Several advantages of this embodiment are that the waveguides can come into actual mechanical contact without refractive index discontinuities caused by intervening layers of different materials and that the electrodes do not need to be transparent.

Figure 3A:
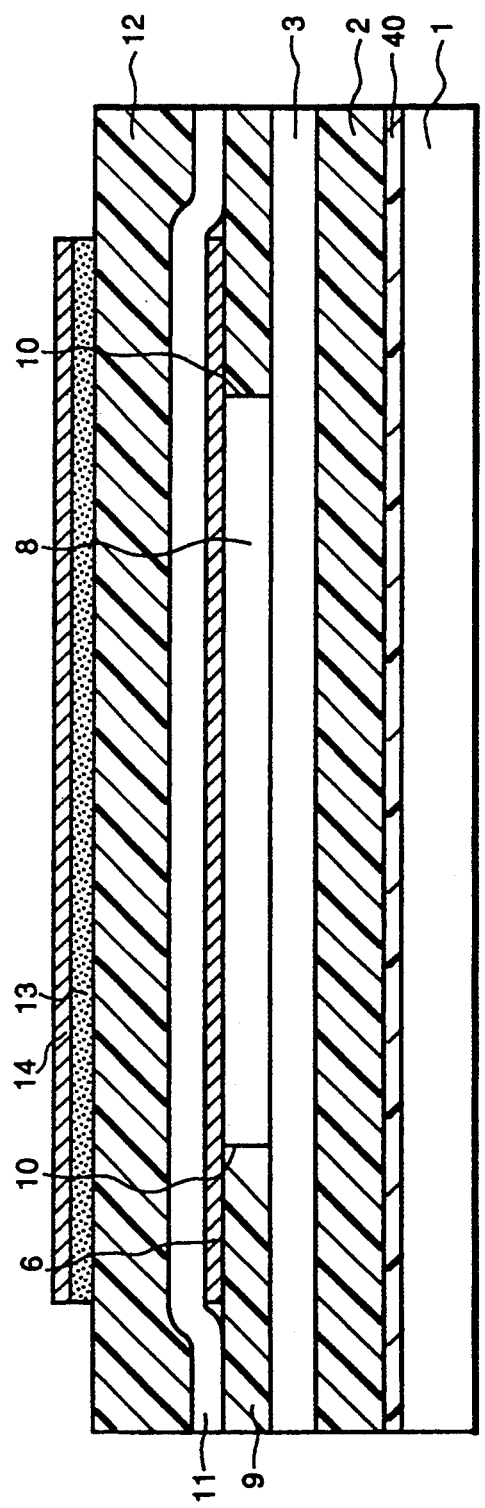
FIG. 3a is a cross-sectional view of another embodiment of a switch of the present invention in an unactuated state.
Figure 3B:
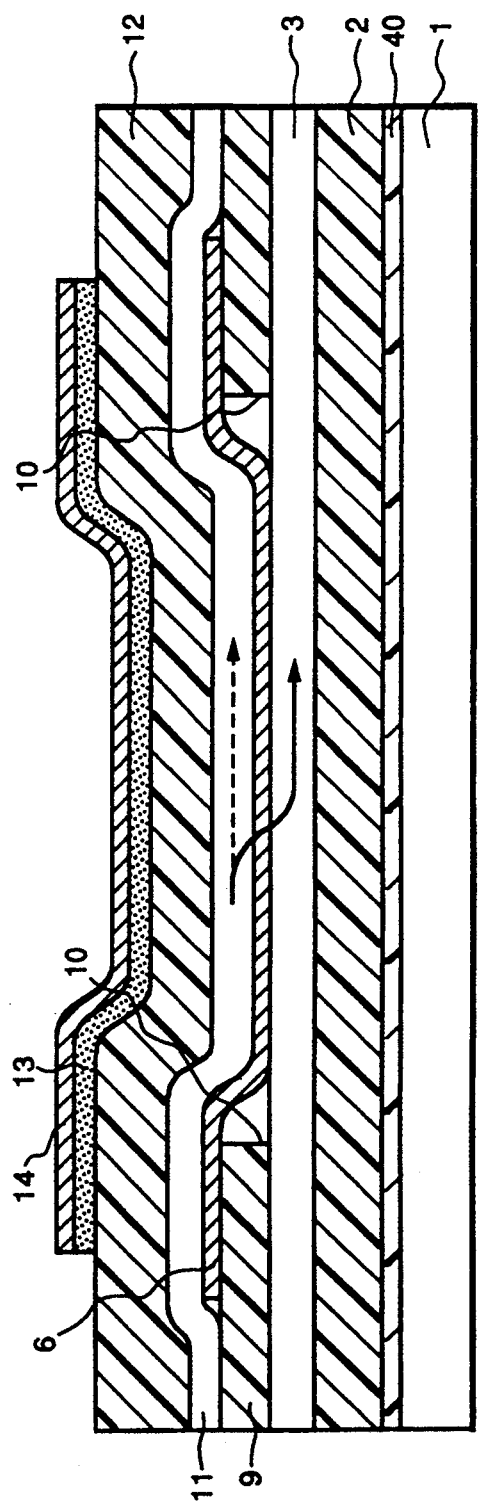
FIG. 3b is a view of the switch of FIG. 3a in an actuated state.

FIG. 3a is a cross-sectional view of an embodiment of a piezoelectric switch of the present invention in an unactuated state, and FIG. 3b is a view of the switch of FIG. 3a in an actuated state. This embodiment differs from that of FIGS. 1a–1b in that one of the electrodes, first piezoelectric electrode 14, is situated over a piezoelectric strip line 13 and second cladding layer 12 rather than between first waveguide 3 and insulative cladding layer 9, as first electrode 5 is in the embodiment of FIG. 1a. Thus, the fabrication process includes the similar steps of applying first cladding layer 2 on substrate 1, applying and patterning first waveguide 3, applying insulative cladding layer 9, forming air gap 8 in insulative cladding layer 9, forming second electrode 6, forming a second waveguide 11, and laminating second cladding layer 12. The dissimilar steps are applying piezoelectric strip line 13 and applying first piezoelectric electrode 14.

Piezoelectric strip line 13, which is preferably 1-2 $\mu$m thick, changes length in response to a perpendicularly directed electric field. Piezoelectric strip line 13 must overlie second cladding layer 12 to produce, in the actuated state, a lateral stress between these layers and consequently bend the composite beam to relieve this stress, thereby generating a vertical deflection. To apply the electric field across the piezoelectric strip line, the electrodes must be positioned above and below the strip line. Since first piezoelectric electrode 14 is above the optically active layers, the first piezoelectric electrode does not need to be transparent and can include materials such as copper, gold, platinum, or chromium, for example. In one embodiment, the piezoelectric electrode has a thickness of about 1000 Å. Piezoelectric strip line 13 can be patterned from a deposited or sputtered layer of gelatin solution containing a piezoelectric material such as lead zirconate titanate (PZT), for example, which has a large transversal piezoelectric coefficient.

Compared to electrostatic actuation, piezoelectric actuation produces stronger forces with smaller electric fields and does not require that the actuation electrodes be on opposite sides of the gap, thereby reducing the needed gap distance. With regard to manufacturability, the piezoelectric embodiment requires only one transparent electrode instead of two for the electrostatic embodiment, but this advantage is offset by the need of the piezoelectric strip line.

While only certain preferred features of the invention have been illustrated and described herein, many modifications and changes will occur to those skilled in the art. For example, although the description has focussed primarily on electrostatic and piezoelectric waveguide bending forces, any bending actuation force can be used, including electromagnetic forces, thermal forces, fluid forces, and pneumatic forces. It is, therefore, to be understood that the appended claims are intended to cover all such modifications and changes as fall within the true spirit of the invention.

What is claimed is:

1. A microelectromechanical photonic switch, comprising:

a first optical waveguide having a first refractive index;

a second optical waveguide having a second refractive index;

insulative cladding between said first and second waveguides, said insulative cladding having a gap therein and having a lower refractive index than each of the first and second refractive indices, wherein said first waveguide is positioned with a predetermined first waveguide portion on one side of said gap and said second waveguide is positioned with a predetermined second waveguide portion substantially parallel to said predetermined first waveguide portion and situated on an opposing side of said gap;

a first cladding layer facing said first waveguide and said insulative cladding, said first cladding layer having a lower refractive index than said first refractive index;

a second cladding layer facing said second waveguide and said insulative cladding, said second cladding layer having a lower refractive index than said second refractive index; and means for moving at least one of said predetermined first and second waveguide portions closer to the other of said predetermined first and second waveguide portions in response to an actuation force, said moving means comprising a first electrode situated between a portion of said first cladding layer and said gap;

a second electrode situated between a portion of said second cladding layer and said gap; and means for advancing at least one of said first and second electrodes towards the other of said first and second electrodes so as to advance one of said first and second waveguides towards the other of said first and second waveguides.

2. A microelectromechanical photonic switch, comprising;

a first optical waveguide having a first refractive index;

a second optical waveguide having a second refractive index;

insulative cladding between said first and second waveguides, said insulative cladding having a gap therein and having a lower refractive index than each of the first and second refractive indices, wherein said first waveguide is positioned with a predetermined first waveguide portion on one side of said gap and said second waveguide is positioned with a predetermined second waveguide portion substantially parallel to said predetermined first waveguide portion and situated on an opposing side of said gap: and means for moving at least one of said predetermined first and second waveguide portions closer to the other of said predetermined first and second waveguide portions in response to an actuation force, said means for moving comprising a first electrode;

a second electrode comprising an at least partially transparent material and situated between a portion of said second waveguide and a portion of said gap; and means for advancing at least one of said first and second electrodes towards the other of said first and second electrodes so as to advance one of said first and second waveguides towards the other of said first and second waveguides.

3. The switch of claim 2, further comprising:

a first cladding layer facing said first waveguide and said insulative cladding, said first cladding layer having a lower refractive index than said first refractive index; and a second cladding layer facing said second waveguide and said insulative cladding, said second cladding layer having a lower refractive index than said second refractive index.

4. The switch of claim 3, wherein said first electrode comprises an at least partially transparent material situated between a portion of said first waveguide and at least a portion of said gap, and further including an insulator layer situated between said first electrode and at least a portion of said gap.

5. The switch of claim 4, wherein said insulator layer comprises a layer selected from the group consisting of polymeric and silicon dioxide layers.

6. The switch of claim 5, wherein said first and second waveguides comprise a polyimide material and wherein said first and second electrodes comprise indium tin oxide.

7. The switch of claim 6, wherein said first and second cladding layers comprise a polyimide material and wherein said insulator layer comprises silicon dioxide.

8. The switch of claim 3, further comprising a substrate facing a surface of said first cladding layer, said surface of said first cladding layer facing away from said first waveguide and said insulative cladding.

9. The switch of claim 3, further including a piezoelectric strip line situated between said first electrode and said second cladding layer.

10. The switch of claim 9, wherein each of said first and second waveguides comprises a polyimide material, said second electrode comprises indium tin oxide, and said first electrode comprises a metal selected from the group consisting of chromium and platinum.

11. The switch of claim 10, wherein said first and second cladding layers comprise a polyimide material and wherein said piezoelectric strip line comprises lead zirconate titanate.

12. A method of fabricating a microelectro-mechanical photonic switch on a substrate, comprising the steps of:
applying a first cladding layer over said substrate;
applying a first waveguide over said first cladding layer;
applying a first electrode over said first cladding layer;
applying an insulative cladding over said first cladding layer, said insulative cladding having an opening extending through to at least a portion of said first waveguide;
applying a second electrode over a portion of said insulative cladding including a portion of said opening;
applying a second waveguide over said opening; and
applying a second cladding layer over said second waveguide.

13. The method of claim 12, further including the step of applying an insulator layer over said first electrode prior to applying said insulative cladding over said first cladding layer.

14. The method of claim 13, wherein a portion of said first waveguide is covered by said first electrode during the step of applying said first electrode over said first cladding layer.

15. The method of claim 12, further including the steps of:
applying a sacrificial layer in said opening prior to applying said second electrode; and
removing said sacrificial layer after applying said second electrode.

16. The method of claim 12, wherein the step of applying a first waveguide comprises applying a polymer material over said first cladding layer and exposing at least a selected portion of said polymer material to light to increase the index of refraction of said selected portion of the polymer and thereby form said first waveguide.

17. A method of fabricating a microelectro-mechanical photonic switch on a substrate, comprising the steps of:
applying a first cladding layer over said substrate;
applying a first waveguide over said first cladding layer;
applying an insulative cladding over said first cladding layer, said insulative cladding having an opening extending through to at least a portion of said first waveguide;
applying one electrode over a portion of said insulative cladding including at least a portion of said opening;
applying a second waveguide over said opening;
applying a second cladding layer over said second waveguide.
applying a piezoelectric strip line over said second cladding layer; and
applying an additional electrode over said piezoelectric strip line.

18. The method of claim 17, wherein a portion of said first waveguide is covered by said insulative cladding layer during the step of applying said insulative cladding over said first cladding layer.

19. The method of claim 17, further including the steps of:
applying a sacrificial layer in said opening prior to applying said one electrode; and
removing said sacrificial layer after applying said one electrode.

* * * * *